United States Patent [19]

Togai et al.

[11] Patent Number: 5,270,575

[45] Date of Patent: Dec. 14, 1993

[54] DEVICE FOR CONTROLLING CHANGE IN IDLING

[75] Inventors: Kazuhide Togai, Takatsuki; Tetsuro Ishida, Kyoto; Katsunori Ueda, Kyoto; Yoshiaki Danno, Kyoto; Yasuki Tamura, Okazaki; Katsuo Akishino; Toyoaki Fukui, both of Kyoto, all of Japan

[73] Assignee: Mitsubishi Jidosha Kogyo Kabushiki Kaisha, Tokyo, Japan

[21] Appl. No.: 933,004

[22] Filed: Aug. 19, 1992

Related U.S. Application Data

[63] Continuation of Ser. No. 737,386, Jul. 29, 1991, abandoned.

[30] Foreign Application Priority Data

Nov. 30, 1989 [JP] Japan .................................. 1-308987
Nov. 30, 1989 [JP] Japan .................................. 3-308988

[51] Int. Cl.$^5$ ........................ F02D 41/08; H02J 7/00
[52] U.S. Cl. ............................................... 290/40 C
[58] Field of Search ............. 123/339, 585; 290/40 R, 290/40 A, 40 B, 40 C

[56] References Cited

U.S. PATENT DOCUMENTS

| | | | |
|---|---|---|---|
| 4,510,903 | 4/1985 | Sakakiyama | 123/339 |
| 4,553,516 | 11/1985 | Hasegawa | 123/339 |
| 4,633,093 | 12/1986 | Otobe et al. | 123/339 |
| 4,649,878 | 3/1987 | Otobe et al. | 123/339 |
| 4,651,081 | 3/1987 | Nishimura et al. | 123/333 |
| 4,682,044 | 7/1987 | Hotate et al. | 290/40 C |
| 4,877,273 | 10/1989 | Wazaki et al. | 290/40 C |
| 5,038,728 | 8/1991 | Yoshida et al. | 123/339 |
| 5,057,764 | 10/1991 | Fujimoto et al. | 123/339 |
| 5,083,038 | 1/1992 | Fukushima et al. | 290/40 C |

Primary Examiner—Willis R. Wolfe
Attorney, Agent, or Firm—Abelman Frayne & Schwab

[57] ABSTRACT

A parameter representing a real generation amount is detected and the intake is increased based on the detected parameter instead of on-information of the switch of the electric load. Therefor, the rotation speed in idling is stabilized without excess idle-up. The controllability is excellent due to the combination with controlling the load of the alternator itself.

12 Claims, 15 Drawing Sheets

DEVICE FOR CONTROLLING CHANGE IN IDLING

This application is a continuation of application Ser. No. 737,386, filed Jul. 29, 1991 now abandoned.

FIELD OF THE INVENTION

This invention relates to a device for controlling a change in idling of an internal-combustion engine which drives an alternator, and especially relates to a device for reducing uncomfortable engine vibration even if an electric load suddenly increases during idling. This invention is useful for an automobile with a gasoline engine.

BACKGROUND OF THE INVENTION

An automobile is provided with an alternator which is rotated by an engine and generates an electric power. During rotation of the engine, the electric power from the alternator is supplied to various electric loads, and, surplus power is stored in a battery.

In the alternator, a stator coil of a stator generates a three-phase alternating current (AC) when a rotor having a field coil is rotated. The AC power is converted to a DC by a three-phase bridge type rectifier having six diodes.

The voltage amplitude of the generated power is in proportion to the rotational speed of the rotor, and, the amplitude of a field current flowing in the field coil. Because a constant voltage must be kept for supplying the power to the load and for charging the battery, when the rotational speed becomes high, and the generated voltage goes over a predetermined value, a regulator controls the voltage by adjusting the field current.

The regulator adjusts the amount of the field current flowing in the field coil, based on the current supplied to the loads. A transistor type regulator controls the field current by changing a duty ratio, which is determined by ON/OFF of a power transistor. By adjusting the field current, the voltage generated by the alternator is controlled and over discharge or over charge of the battery is prevented.

The alternator increases the field current when the electric load increases, and decreased the field current when the electric load decreases. Thus, the torque required for rotating the alternator becomes large when the load increases, and the torque becomes small when the load decreases.

When the engine is operate in idling, if the electric load suddenly increases, then the rotational speed of the engine goes down because the torque required for rotating the alternator becomes large. Therefore, in a bad case, a driver feels an uncomfortable vibration of the automobile due to unstable rotation of the engine.

Because the engine generates a small torque when idling, if a slow idling speed of the engine is set for reducing fuel expense, then such discomfort occurs.

When the engine is idling, the driver is very sensitive to noise and fluctuations of the engine rotation. This is because his attention required is not for performing special operations and, there is little noise inside of the passenger compartment. In such a condition, when the engine speed drops by reason of an increase of the electric load, for example, operation of an air conditioner, the driver senses the drop in the engine speed. Therefore, the driver may feel that the engine is going to stop. Besides, if the vibration increases, the discomfort to the driver also increases.

For preventing above-mentioned discomfort, the present invention provides a device for controlling changes in idling speed which can limit the drop of the rotation speed of the internal-combustion engine even if the electric load suddenly increases during idling.

DISCLOSURE OF INVENTION

The device of the present invention comprises; an engine, an alternator drive by said engine, means for detecting a field current of said alternator as a generation parameter representing a real condition of a generating operation in said alternator, for suppressing an increase of said field current based on the field current detected by said field current detecting means, and means for controlling the amount of increase in air intake of said engine based on said detected field current.

Therefore, because the amount of increase in the air intake is suitably set for the real generating condition, it is possible to cheaply and efficiently stabilize the idling speed without an excess idling-up operation.

As another case, the device of the present invention further comprises means for suppressing an increase of field current of the alternator, based on the amount of field current as the parameter detected by the generation parameter detecting means.

Therefore, as the load of the alternator itself is controlled, a change of idling speed is more easily controlled.

In that case, it is desirable to control the upper limit of current flow ratio of the field current, which is adjusted by a regulator of the alternator, the upper limit being set based on a real current ratio just before the control.

Further, it is desired to increase the air intake when a real value goes over a predetermined value, the real amount being a value representing a real generation amount of the alternator detected from the real current ratio, or, being a value representing a real torque load on the engine detected from the real generation amount.

It is desired to temporarily stop renewal of the upper limit when the real amount goes over the predetermined value.

As another method, an average current ratio is repeatedly calculated from a present current ratio and a past current ratio, which are repeatedly detected. Then, a new upper limit is determined from the last calculated average current ratio.

In this case, desirably the new upper limit exceeds the last average current ratio by a predetermined value.

Moreover, it is desired to increase the air intake when a real amount goes over an another predetermined value, this real amount being a value representing a real generation amount of the alternator detected from the average current ratio, or being a value representing a real load torque of the engine detected from the real generation value. It is desirable to temporarily set the last average current ratio as the newest upper limit.

On the other hand, another device of the present invention comprises; means for detecting rotation speed of an engine, means for detecting a status of a field current of an alternator drived by the engine, means for setting a real amount based on the detected status of the engine and the detected rotation speed, the real value representing a real generation amount of the alternator, or, representing a real load torque of the engine based on the real generation amount of the alternator, and means for controlling an increase in intake air of the engine based on a set real amount.

In this case, the intake air is desirably increased when the real amount goes over a predetermined value. Further desirably, the increase of the intake air is terminated when the real amount falls below second predetermined value, being smaller than above-mentioned predetermined value. Moreover, the amount of the increase is a constant value or a variable value set by the real amount.

BEST MODE FOR CARRING OUT THE INVENTION

Figure 1:
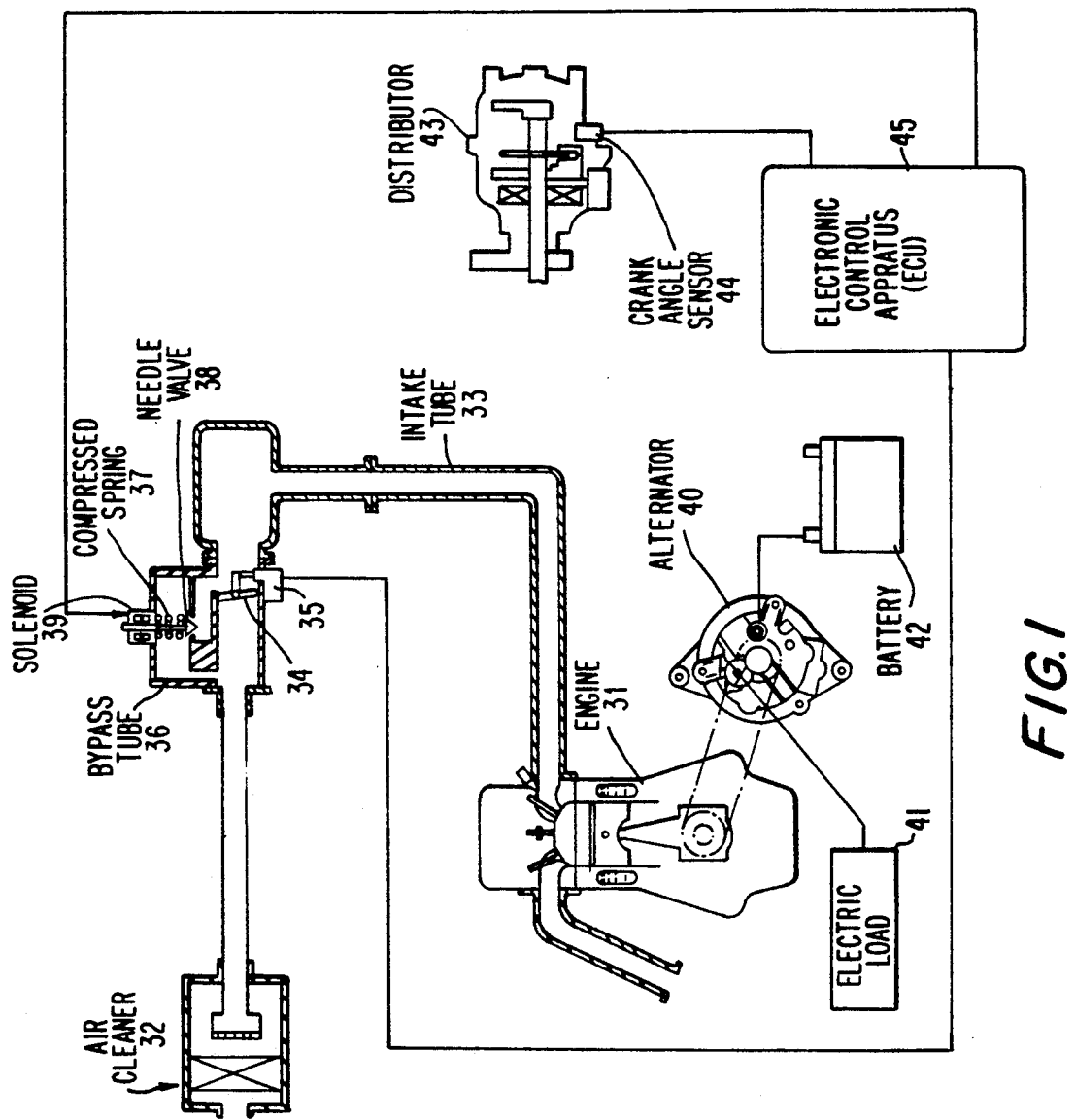
FIG. 1 shows a drive system of a gasoline-engine-automobile.

Referring to the drawings, embodiments of the invention will be explained.

As shown in FIG. 1, air is supplied to an engine 31 through an air-cleaner 32 and an air supply tube 33. The tube 33 is provided with a throttle valve 34 which is opened and shut by an accelerator pedal (not shown). In idling, the valve 34 is fully shut and this idling status is detected by an idle switch 35. A bypass tube 36 is connected between an upper side and a lower side of the air supply tube 33 so as to bypass the throttle valve 34. In the bypass tube 36, there is a needle valve (bypass valve) 38 connected to a compressed coil spring 37. The bypass tube 36 is opened and shut by the needle valve 38. The valve 38 is driven by the duty driving of a solenoid 39 or a stepping motor (not shown). By this mechanism, the amount of an intake air is increased or decreased by an electric control apparatus 45, independently of the throttle valve 34.

An alternator 40 is rotated by the engine 31 and generates electric power which is supplied to various loads 41 and a battery 42 for charging. The battery 42 supplies the electric power to the loads 41 when the generated power is not sufficient, or, when power is not generated. A crank angle sensor 44 is set on a distributor 43.

The electric control apparatus 45 controls various control units such as solenoid 39 for the generation of a control based on signals received from sensors such as the idle switch 35, the crank angle sensor 44 and etc.

Figure 2:
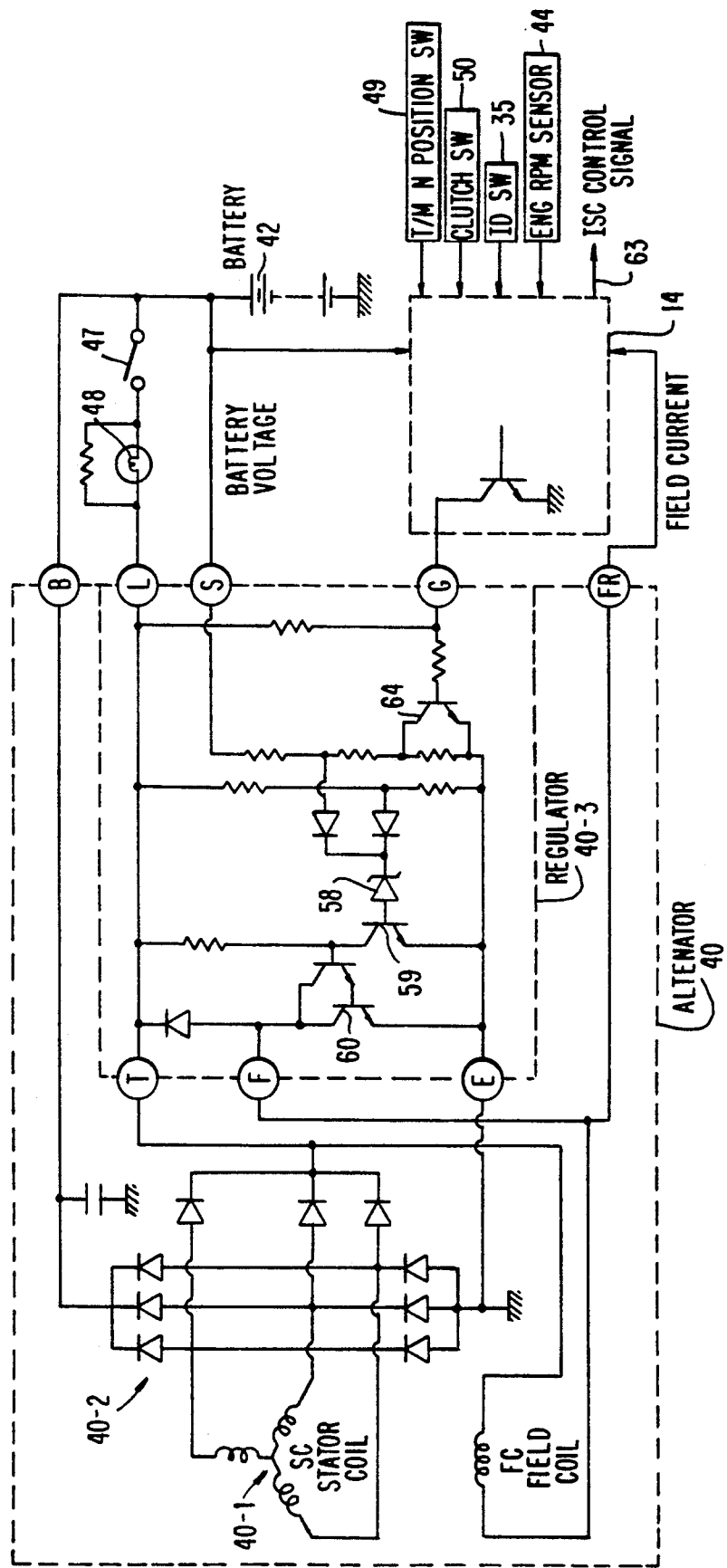
FIG. 2 shows a circuit configuration using a control of a G-terminal of a regulator.

In FIG. 2, the alternator 40 comprises a generation part 40-1 having a stator coil SC and a field coil FC, a diode-type rectifier 40-2 and a regulator 40-3. The regulator 40-3 adjusts the amount of current generated in the generation part 40-1, by controlling the duty ratio of field current flowing into the field coil FC according to a voltage applied to an S-terminal. Namely, in the voltage regulator 40-3, a generated voltage is controlled by an analog voltage applied to a zener diode 58 through the S-terminal. In operation, a transistor 59 is turned on or off by an output of the zener diode 58, which itself is turned on or off by the analog input voltage e. Then, a power transistor 60 is turned on or off, and the field current is turned on or off.

The duty ratio (DFRR) of the field current in the field coil FC is detected through an FR-terminal by a control unit 14. The detected duty ratio is in proportion to a generation ratio (ratio between an actual generation amount and an available full generation). In FIG. 2, 47 denotes an ignition switch, 48 denotes a charge lamp.

In an embodiment shown in FIG. 2, the control unit 14 controls a ratio DG that is a ratio of a G-terminal being not grounded. In the regulator 40-3, when the G-terminal is grounded, a transistor 64 is turned off, the zener diode 58 is turned on, and the power transistor 60 is turned off. Therefore, no voltage is generated even if any voltage is applied to S-terminal. It is possible to arbitrarily limit a generation amount by setting the non-grounded ratio DG. The control unit 14 detects an actual generation status from the duty DFRR at the F-terminal. When the unit 14 judges that the engine is in idling from the output signal of the sensor 35, or the sensor 44, or a switch 49 for detecting a neutrality of a transmission, or a clutch switch 50 etc., the unit 14 limits the generation amount by controlling the ground of the G-terminal according to the detected actual generation status.

As a first embodiment, referring to FIGS. 3 to 9 and 12, an intake air control of the electric control apparatus 45 will be explained, and referring to FIG. 2, a generation control of the control unit 14 will be explained. In the case, the electric power generation is controlled by controlling the non-ground ratio DG at the G-terminal.

Figure 3:
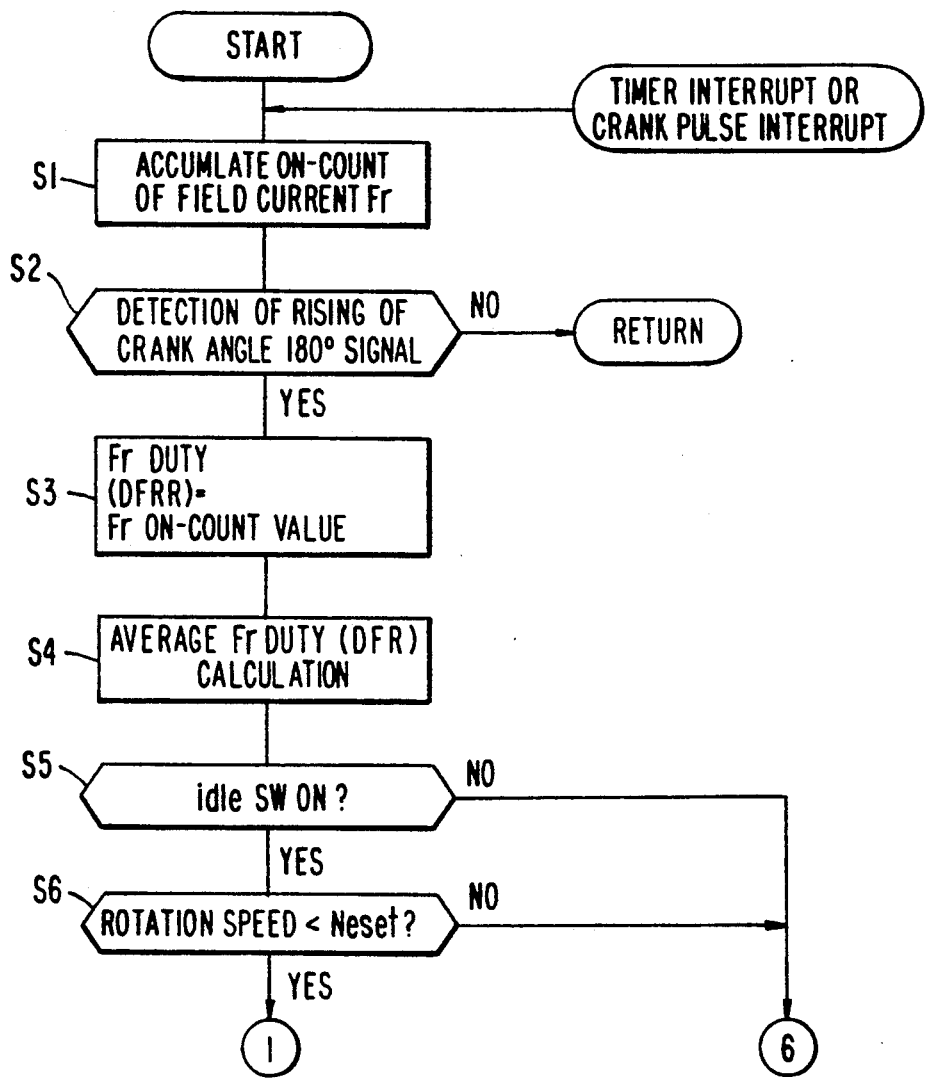
FIGS. 3, 4, 5, 6 are flow charts showing control operations of first embodiment.

If FIG. 3, a counter inside of the control unit 14 accumulates a time period of ON (ON of the field current Fr) at the FR-terminal by a time interruption, or, a crank-pulse interruption (step S1). When a crank-angle 180 degree signal from the crank angle sensor 44 rises, the control unit 14 sets a counted value at the rising time as an instant actual current flow ratio of the field current Fr i.e. Fr-duty DFRR. (steps S2, S3).

DFRR=(accumulated time of FR-on)/(time period between the rising points of the crank-angle 180 degree signal).

Basically, this Fr-duty DFRR, a ratio between an actual field current and that of full generation, or the field current is used as a parameter representing an actual generation status for controlling a fluctuation in idling.

In that case, the generation status or condition always delicately changes. It is desired to use an average of the generation value for preventing the control being directly affected by the delicate change. The average is obtained by such a method of simple average in a predetermined time period, or a first degree filter etc.

In the step S4, an average Fr-duty DFRi representing this time average generation value is calculated by the first degree filtering operation according to a following equation.

$$DFRi = a \times DFRi-1 = (1-a) \times DFRR.$$

In the equation, a denotes a filter gain, $0 < a < 1$. Preferably a is larger than 0.5, for example, $a = 0.75$.

Figure 4:
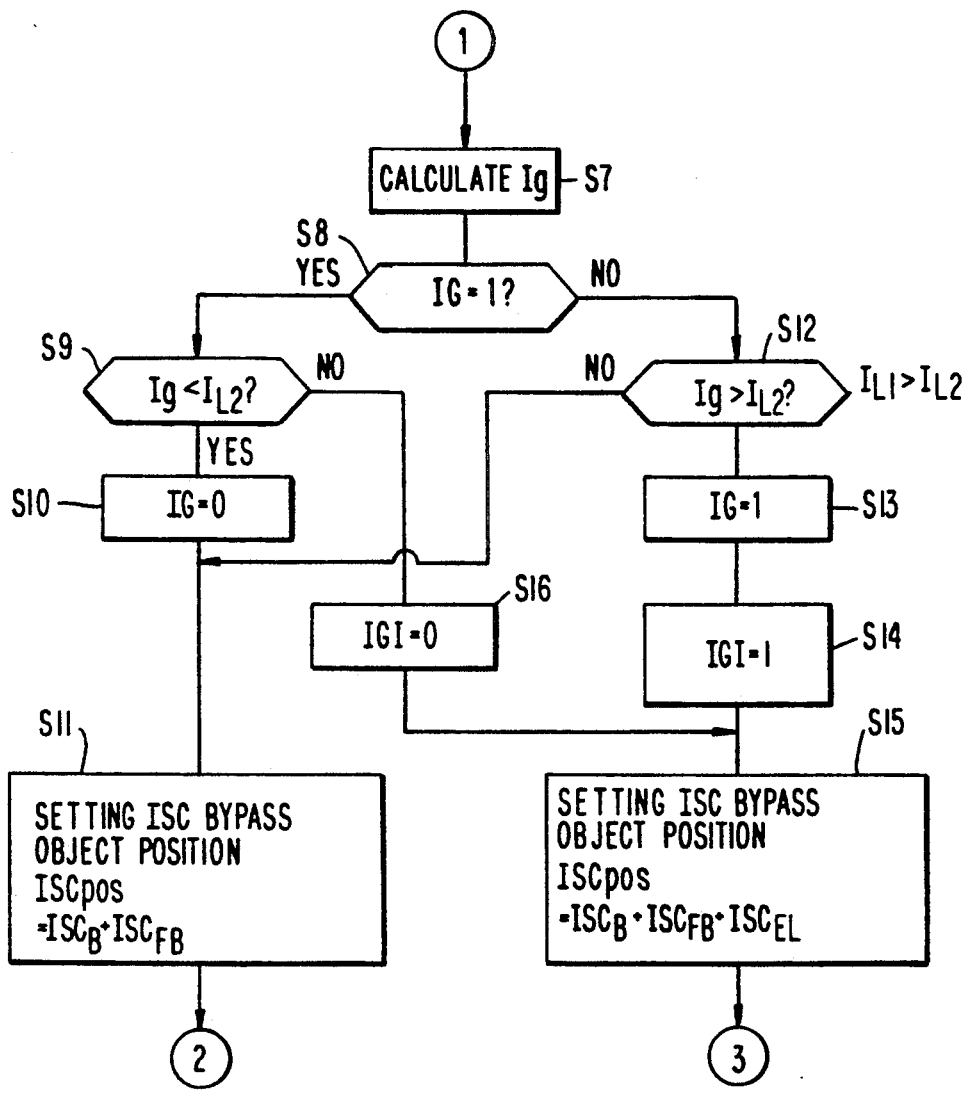

If the idle switch 35 is turned on and the engine rotation speed is lower than a predetermined value $Ne_{SET}$ (steps Sr, S6), in the step S7 shown in FIG. 4, the control unit 14 calculates a generation current Ig. If the conditions in the steps S5 and S6 are not satisfied, in the step S27 shown in FIG. 6, 100% is set as an object value DFROBJ of the Fr duty.

The $Ne_{SET}$ is set a value between an object rotation speed $Ne_{OFF}$ at the time of an air-conditioner being off, and an object rotation speed $Ne_{ON}$ at the time of the air-conditioner being on. For example, if $Ne_{OFF}$ is 600 rpm and $Ne_{ON}$ is 900 rpm. $Ne_{SET}$ is 800 rpm.

Figure 7:
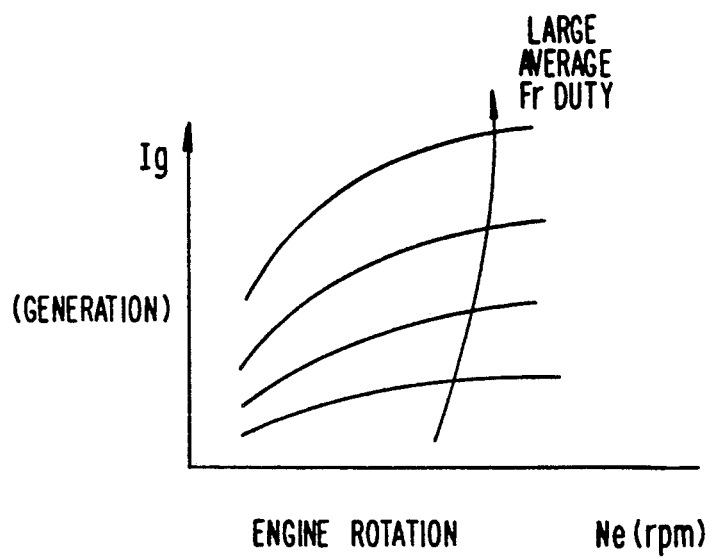
FIG. 7 shows a relation between a rotation speed of an engine and a generated current by using an average F4-duty as a parameter.

In the step S7, Ig is obtained from a map shown in FIG. 7, the value of Ig being determined by this time rotation speed and the average Fr-duty DFRi, because there is a close relation between the generation current Ig and the rotation speed Ne of the engine under the parameter of the average Fr-duty DFR. The map shown in FIG. 7 is provided with the control unit 14.

Figure 8:
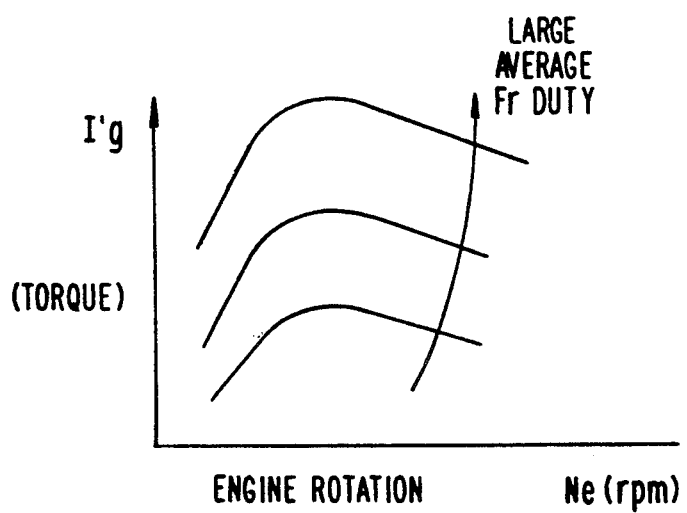
FIG. 8 shows a relation between a rotation speed of an engine and a torque required to an alternator by using an average Fr-duty as a parameter.

As another example of Ig calculation, Ig is obtained from a map shown in FIG. 8, the value lp being determined as Ig' by this time rotation speed and the average Fr-duty DFRi, because there is a close relation between a value Ig' representing a torque and the rotation speed Ne under the parameter of the FR-duty DFRi. The map is provided with the control unit 14. There is a good relation between the generation current lp and the torque Ig' required for generating the current lp.

After calculating Ig, in the step S8, it is judge whether the electric load was on (IG = 1) or off (IG = 0) until now. If the load was on, for providing hysterisis characteristics, in the step S8, the value IG is compared with a reference value $I_{L2}$ ($I_{L1} > I_{L2}$). In the case of $Ig < I_{L2}$, it is judged that the electric load is turned off, then a flag is resent as IG = 0 (step S10). In this case, an increase of the intake air for generation is not carried out. Namely, in the step S11, an object position $ISC_{POS}$ of a bypass valve in ISC (Idle Speed Control) is set by a following equation.

$$ISC_{POS} = ISC_B + ISC_{FB}.$$

$ISC_B$ denotes a base position according to a water temperature of the engine etc. $ISC_{FB}$ denotes a compensation component of the position by a feed-back control in ISC based on the rotation speed.

If IG = 0 i.e. the electric load was off in the step S8, the value Ig is compared with a large reference value $I_{L1}$ in the step S12. In the case of $Ig > I_{L1}$, it is judged that the load is turned on, then the flag is set as IG = 1 (Step S13).

In the case of first flag IG = 1, in the step S14, an initial flag is set as IGI = 1, then the object position $ISC_{POS}$ of the ISC bypass valve is set according to a following equation in the step S15. Therefore, the increase of the intake air for the generation is done according to the $ISC_{POS}$.

$$ISC_{POS} = ISC_B + ISC_{FB} + ISC_{EL}$$

$ISC_{EL}$ denotes a idle-up position based on the electric load. In this embodiment, $ISC_{EL}$ is constant value.

If $IG \geq I_{L2}$ in the step S9, as the electric load is continuously turned on, the initial flag IGI is reset as IGI = 0 in the step S16, and the $ISC_{POS}$ including the increase of the intake air for generation is set in the step S15. If $Ig \leq I_{L1}$ in the step S12, as the load is continuously turned off, the $ISC_{POS}$ without any increase of the intake air for generation is set in the step S11. The ISC bypass valve is driven by a routine shown in FIG. 12, after the $ISC_{POS}$ is set in the step S11 or S15. The routine will be described later.

Figure 5:
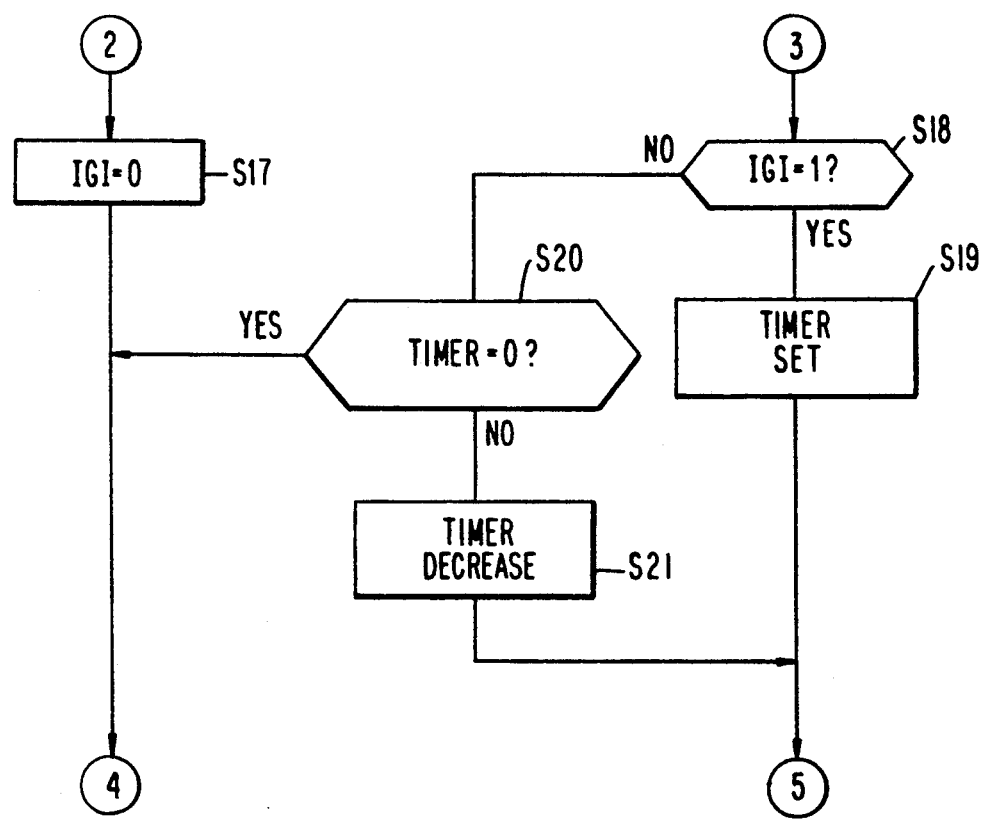
Figure 6:
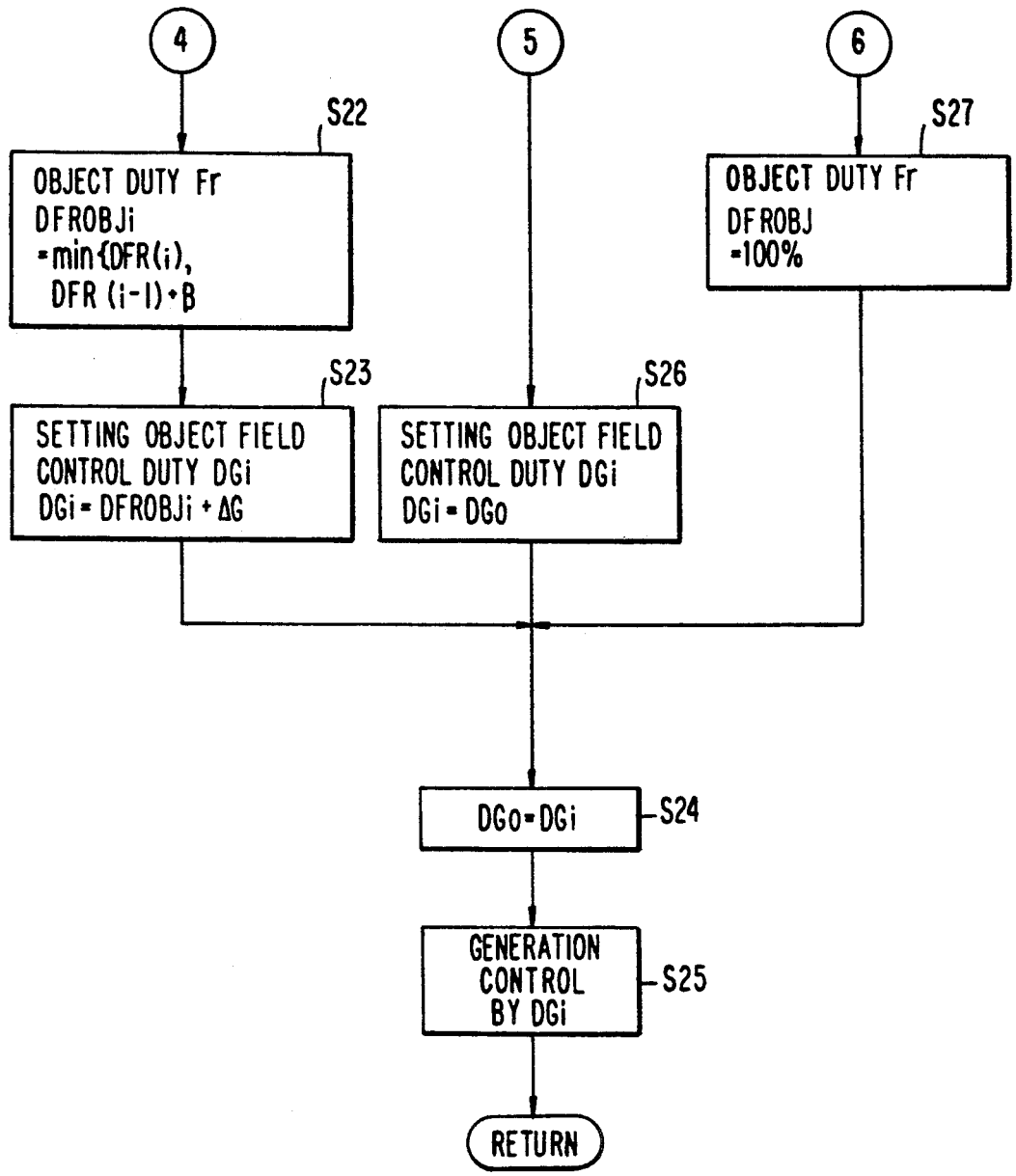

After $ISC_{POS}$ is set, in the step S17 shown in FIG. 5, the initial flag IGI is reset as IGI = 0, then in the step S22 shown in FIG. 6, a control for permits a change of the field coil current.

In the step S22, a value DFRROBJi of this time object of Fr-duty is given by a following equation.

$$DFROBJi = \min. (DFRi, DFRi-1+\beta).$$

Namely, for safety, minimum value is selected. $\beta$ is a very small value, for example, 0.4%. Next, in the step S23, a non-earth duty DGi for determining an upper limit of a generation value at this time is obtained as an object duty for controlling the field current by a following equation. Then, in the step S24, an output value DGo of the object duty for controlling the field current is renewed by the value DGi. The limitation of the generation is carried out by the value DGi (step S25).

$$DGi = DFROBJi = \Delta G.$$

Wherein, $DG \leq 100\%$. In the case of DG = 100%, a full generation is possible. $\Delta G$ is a small value, for example 4%, 5%. Further $\beta < \Delta G$, for example, $\beta$ is nearly equal to 10% of $\Delta G$. By the control of the steps S22 and S23, it is possible to increase or to decrease the upper limit of the generation value at every time when the crank angle 180 degree signal rises.

In the case that the object position $ISC_{POS}$ of the ISC valve is set in S15, the initial flag IGI is checked. If IGI = 1, for adaptation to a delay of the increase of the intake, a timer is set by a predetermined time during of which time an increase of the generation is stopped after the time when IGI is changed to 1 from 0 (step S19). Next, in the step S26 shown in FIG. 6, the last output value DGo is used as DGi at this time. By outputting the DGi, the same generation control is carried out (steps S24, S25). In the case of IGI = 0 in the step S18, if the timer does not become to 0 (step S20), after the timer is decreased, the same control as that of last time in the step S26 is done.

In the case that the timer is 0 in the step S20, in the step S22 shown in FIG. 6, the object Fr-duty DFROBJi is calculated. In the next step S23, the object duty DGi is obtained by using the Fr-duty DFROBJi and $\Delta G$. In the next step S24, the output value DGo is renewed by the duty DGi.

Figure 9:
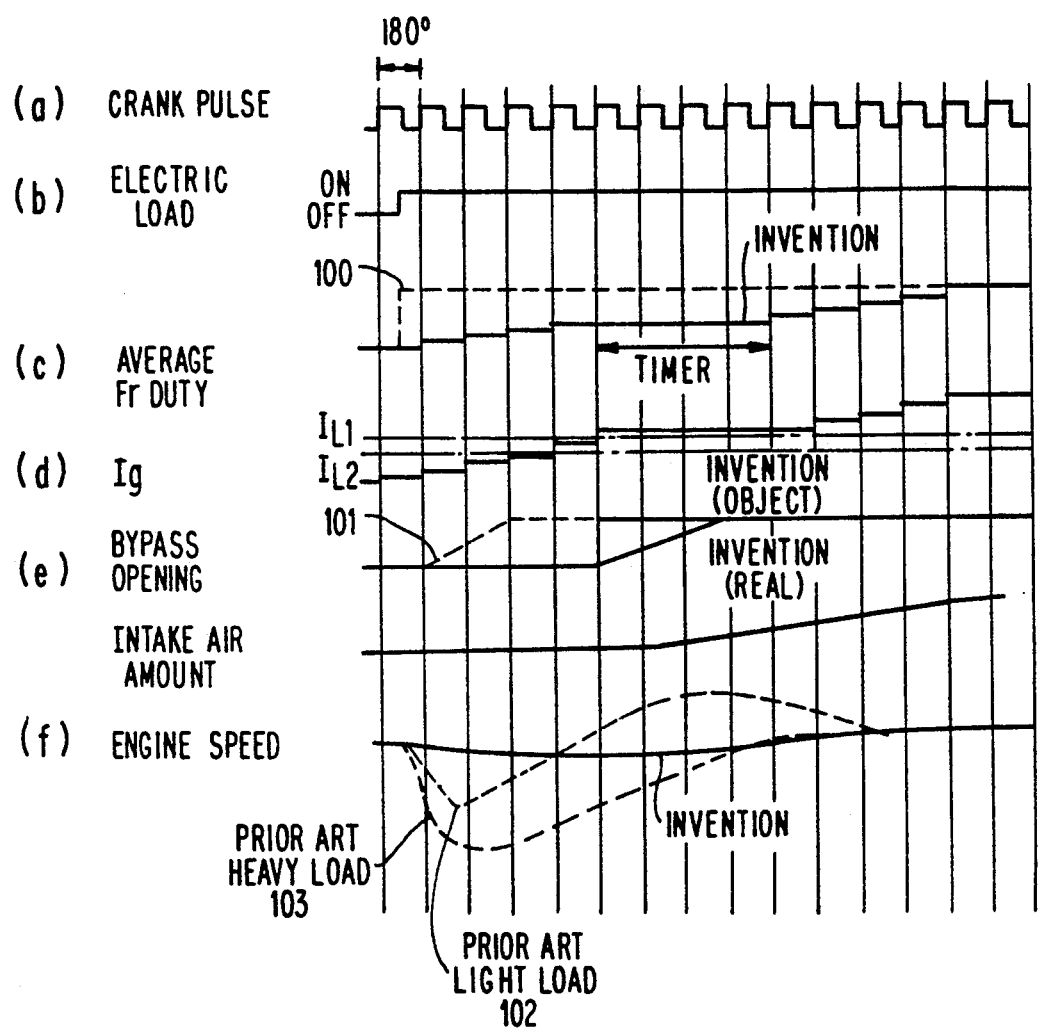
FIGS. 9a–f are a timing chart for an explanation of an effect.

In FIG. 9, an operation timing of above-mentioned first embodiment is shown. As shown in FIG. 9(b), in the prior art, when a switch of the electric load is turned on, only idle-up is carried out by the ISC, and as shown by the dotted line 100 in FIG. 9(c), the duty is suddenly increased. Therefore, as shown by the dotted line 101 in FIG. 9(e), a delay of the actual operation of the ISC bypass valve occurs. In the case of a small electric load, as shown by the dotted line 102, the rotation speed of the engine firstly goes down, next goes up, and after a time goes to the object speed by the feedback control based on the rotation speed. Therefore, a driver feels discomfort. On the other hand, in the case of heavy electric load, as shown by the dotted line 103 in FIG. 9(f), after switching on, the rotation speed goes to a very lower level, because of a response delay of the increase of the intake e.

In the first embodiment of the invention, the intake air is increased only when the rotation speed goes down just after the electric load is turned on, according to the detection of the generation status, the status corresponding to the torque required for generation (steps S7 to S16 in FIG. 4). Therefore, in the case of small load, the rotation speed does not go up suddenly. It is thus possible to sufficiently reduce the fluctuation of the idling.

Figure 10:
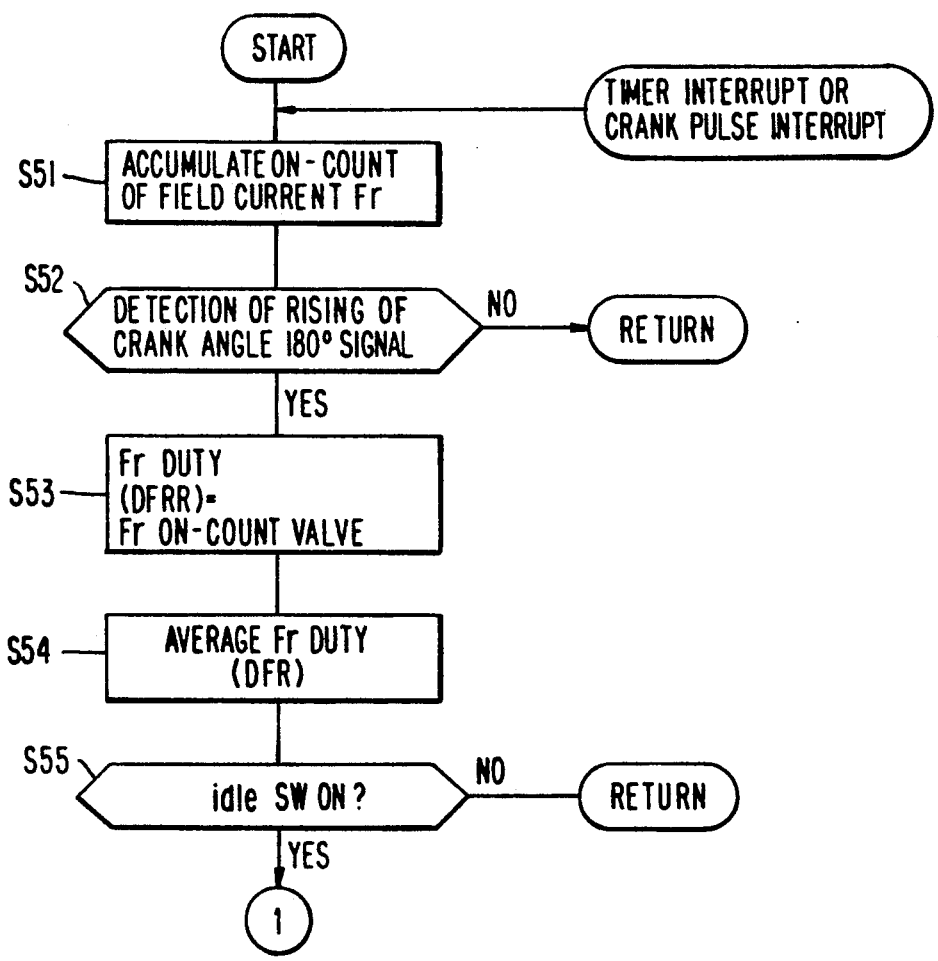
FIG. 10, 11 are flow charts showing control operation of second embodiment.
Figure 11:
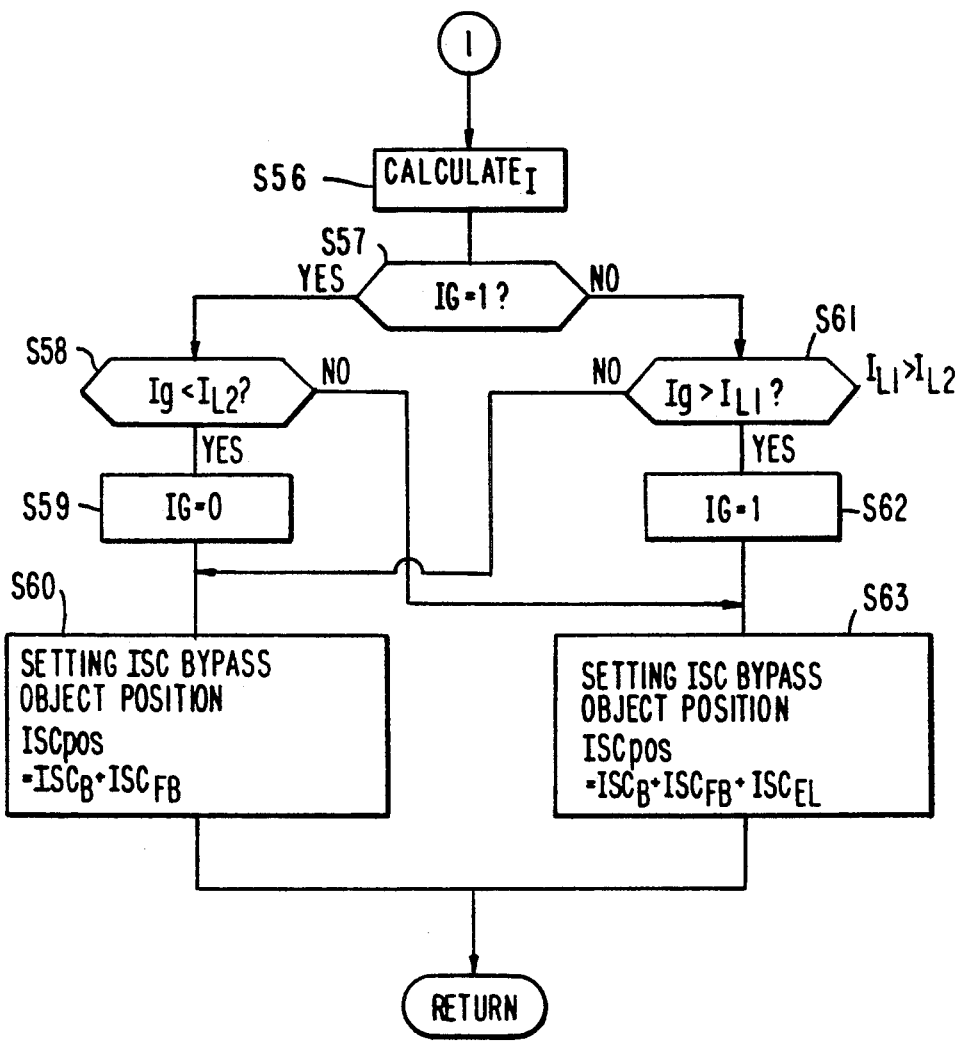

Referring to FIGS. 10 to 13, a second embodiment will be explained. In this embodiment, only control of the intake air is employed. In FIG. 10, a counter inside of the control unit 14 accumulates a time period of ON (ON of the field current Fr) at the Fr-terminal by a time interruption or a crank pulse interruption (step 51). When a crank-angle 180 degree signal from the crank angle sensor 44 rises, the control unit 14 sets a counted value at the rising time as an instant actual flow ratio of the field current Fr-duty DFRR (steps S52, S53).

DFRR=(accumulated time of Fr)/(time period between the rising points of the crank-angle 180 degree signal).

In the step S54, an average Fr-duty DFRi representing this time average generation value is calculated by the first degree filtering operation according to a following equation.

$$DFRi = a \times DFRi-1 + (1-a) \times DFRR$$

Wherein, a denotes a filter gain, $0 < a < 1$. Preferably a is larger than 0.5, for example, $a = 0.75$.

If in idle controlling (step S55), in the step S56, the generation value Ig is obtained from the map shown in FIG. 7 or 8, by same method as the step S7 shown in FIG. 4.

After calculating Ig, it is judged whether the load was on (IG=1) or off (IG=0) until now, in the step S57. If the electric load was on, for providing hysterisis characteristics, at the step S58, the value Ig is compared with a reference value $I_{L2}$ ($I_{L1} > I_{L2}$). In the case of IG<$I_{L2}$, it is judged that the load was turned off, when a flag IG is reset as IG=0 (S59). In this case, the increase of the intake air for generation is not carried out. As same as the step 11 in FIG. 4, at the step S60, the object position $ISC_{POS}$ of the bypass valve in ISC is set by the following equation.

$$ISC_{POS} = ISC_B + ISC_{FB}$$

If IG=0 i.e. the load is off at the step S57, the value Ig is compared with a large value $I_{L1}$ at the step S61. In the case of Ig>$I_{L1}$, it is judged that the load is on, then the flag is set as IG=1 (step S62). At the step S63, the object position $ISC_{POS}$ of the ISC valve is set according to the following equation. Therefore, the increase of the intake air is done according to the $ISC_{POS}$.

$$ISC_{POS} = ISC_B + ISC_{FB} + ISC_{EL}$$

Figure 13:
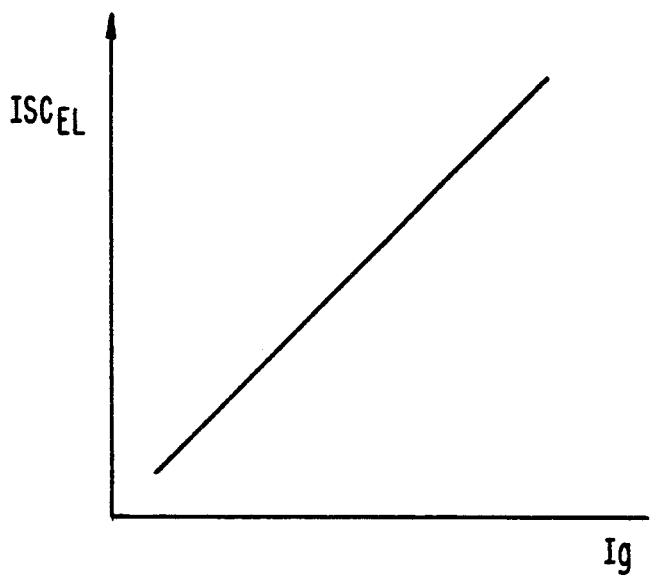
FIG. 13 shows a relation between a generated current Ig and idle-up-position $ISCe_{EL}$ in ISC.

In this case, $ISC_{EL}$ is changed according to Ig as shown in FIG. 13.

Figure 12:
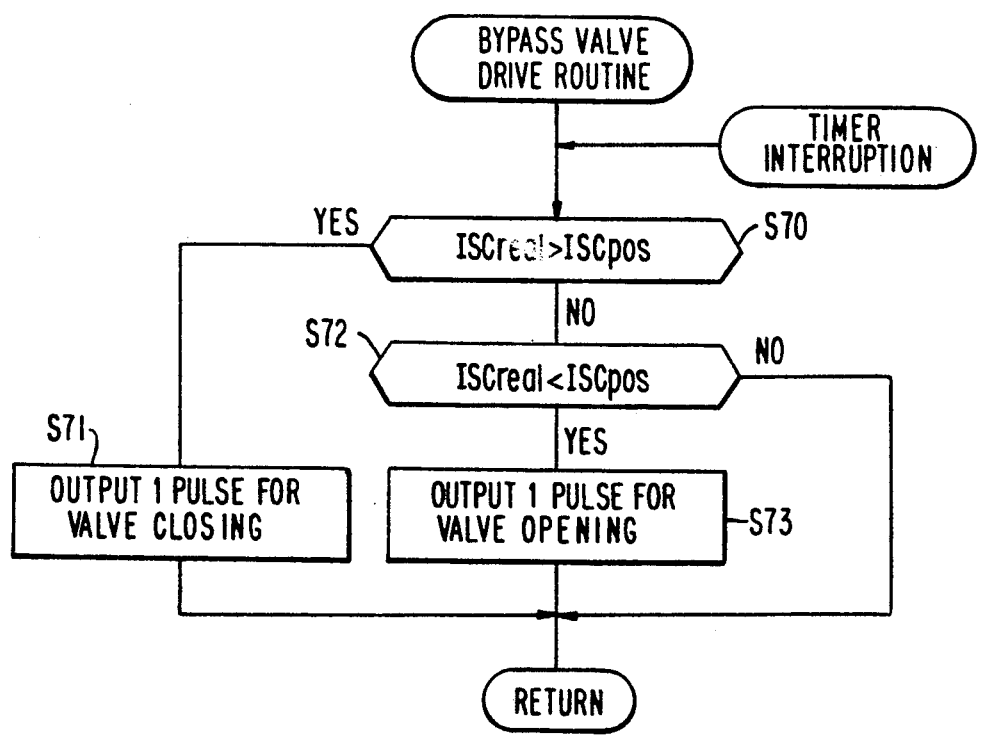
FIG. 12 is a flow chart showing a routine for driving a bypass valve.

The bypass valve is driven by the routine shown in FIG. 12, after the $ISC_{POS}$ is set at the step S60 or S63.

In FIG. 12, by the time interruption, at the step S70, an actual ISC idle position $ISC_{REAL}$ is compared with the object position ISC-pos. If $ISC_{REAL}$ is larger than $ISC_{POS}$, at the step S71, the bypass valve is driven to close by only one step by the stepping motor, only one pulse in a closing direction being applied to the stepping motor. If $ISC_{REAL}$ is smaller than $ISC_{POS}$, at the step S72, only one pulse in opening direction is applied to the stepping motor, then the bypass valve is driven to open by only one step by the motor. In the case of $ISC_{REAL}$ =$ISC_{POS}$, the bypass valve is not driven.

Figure 14:
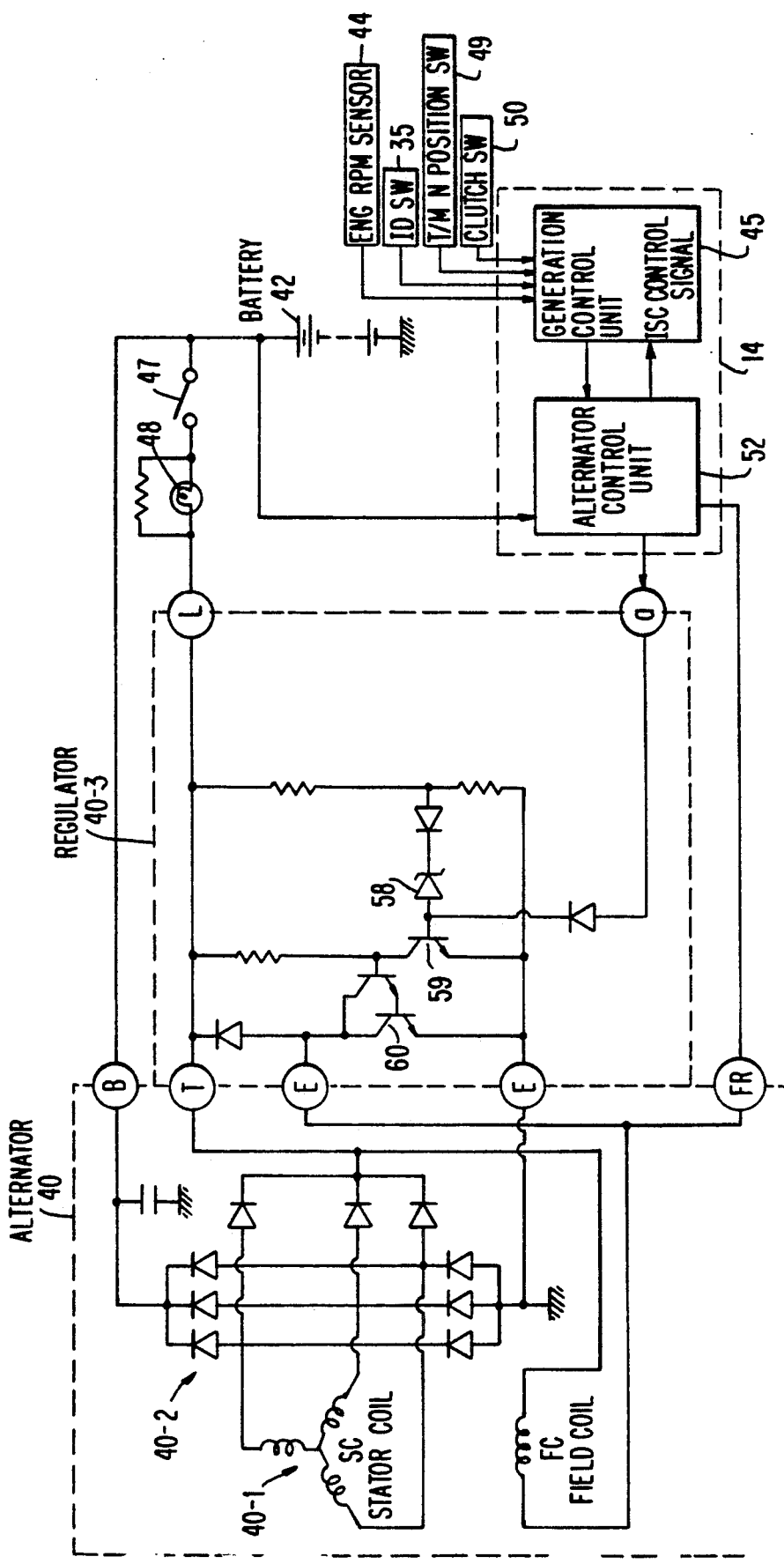
FIG. 14 shows a circuit configuration having a regulator outside an alternator.

In FIG. 14, the voltage regulator 40-3 is set apart from the alternator 40. The regulator 40-3 stops a generation when a high level is applied to its a-terminal. By the high level at the a-terminal, the transistor 59 is turned on and the power transistor 60 is turned off.

Therefore, instead of non-ground duty DGi at the G-terminal, 100−DGi (%) is set as the object duty for controlling the field current, the a-terminal is connected to low level with the duty 100−DGi (%) by the control unit 14.

In FIG. 14, the control unit 14 comprises the electronic control apparatus 45 and an alternator control unit 52. The alternator control unit 52 controls the low level at the a-terminal by the duty of 100−DGi (%) based on a generation control command given from the electronic control apparatus 45. The apparatus 45 controls the ISC valve by the object idle position $ISC_{POS}$ of the ISC bypass based on an ISC control command given from the alternator control unit 52. In this case, the regulator 40-3 and the alternator control unit 52 and the electronic control apparatus are integrated as an electronic control regulator.

Figure 15:
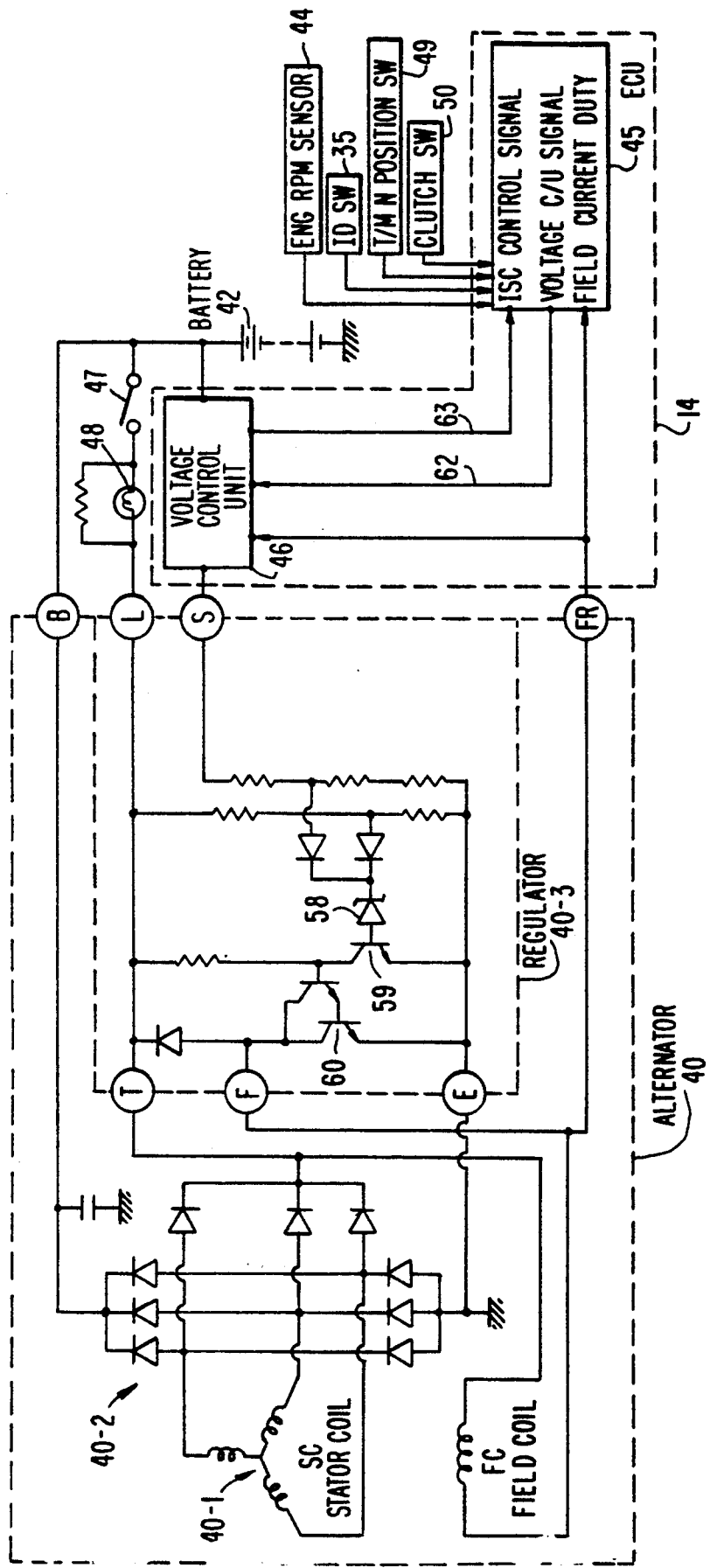
FIG. 15 shows a circuit configuration using a control of an S-terminal of a regulator.

In an embodiment shown in FIG. 15, a voltage control unit (voltage C/U) 46 is connected between the battery 42 and the regulator 40-3. The voltage C/U 46 controls a voltage at a S-terminal of the regulator 40-3 based on a signal 62 from the electronic control apparatus. By this control, the value of the generation is limited and the limitation is reduced. Namely, when the apparatus 45 detects a rising point of the electric load from a rise of the duty at the FR-terminal, if the apparatus 45 detects idling operation from a sensor 35, 44, 49 or 50, the apparatus 45 sends the control signal 62 to the voltage control unit 46 for its operation. The unit 46 applies to S-terminal a high voltage than a standard voltage determined by a battery voltage for limiting the value of generation, and, after the limitation, the unit 46 reduces the voltage applied to S-terminal for reducing the limitation. A change in the voltage applied to S-terminal is sent to the electronic control apparatus 45 as a signal 63. According to the signal 63, the apparatus 45 slowing increases the intake air by controlling the solenoid 39 or the stepping motor.

Figure 16:
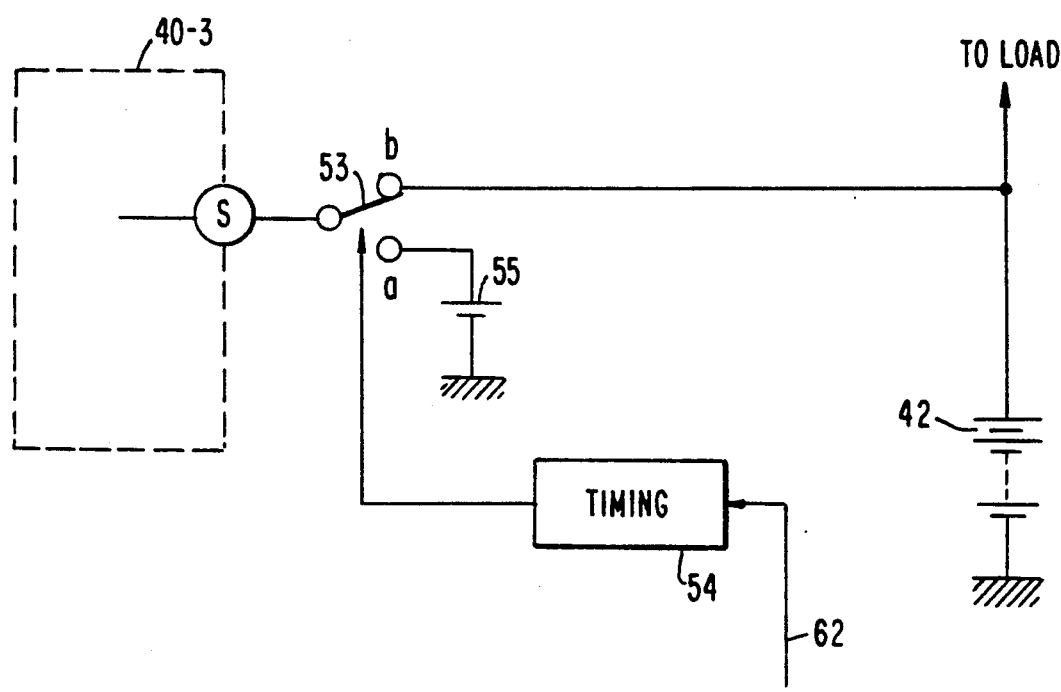
FIG. 16 shows a circuit of a voltage control unit shown in FIG. 15.

An embodiment of the voltage control unit 46 is shown in FIG. 16. The unit 46 comprises a switching device 53, a timing circuit 54 and a fixed voltage source 55. Through a contact-b of the switch device 53, as the standard voltage, the voltage from the battery 42 is applied to S-terminal, and, through a contact-a of the switch device 53, a fixed voltage from the source 55 is applied to the S-terminal. The fixed voltage is set to a value which can stop the generation, if applied to the S-terminal. The timing circuit 54 selects a connection of the contact-a when the circuit receives the control signal 62 from the electronic control apparatus 45, then, at rising point of the electric load, immediately the generation is cut, because instead of the standard voltage, the fixed voltage for cutting the generation, during a predetermined time period, ON-duty of the contact-a is slowing decreased from 100% to 0% and ON-duty of the contact-b is slowly increased from 0% to 100%. The ISC control signal is output according to this ON-duty.

In each embodiment, it is possible to use an arbitrary device which can increase the intake air according to the command from the control unit 14. For example, there are a throttle valve direct-drive type ISC, a bypass air type ISC, a drive by wire (DBW) type ISC etc. Further, to change the intake air of the engine, it is possible to use a valve independent from above-mentioned throttle valve.

Basically, when the idle switch (ID,SW) detects a full close of the throttle valve (or acceleration pedal) and the engine rotation speed sensor (ENG,RPM sensor or crank angle sensor) detects the rotation speed in a range of the idling speed, it is judged that the engine is in idling operation. In addition to above-mentioned condition, when the transmission select switch (T/M select SW) detects a neutral position of the transmission or the clutch switch (clutch SW) detects a disconnection of the clutch, it is possible to judge the idling.

INDUSTRIAL APPLICABILITY

The device of the present invention increases the intake air based on the detected real generating status of the alternator. Therefore, it is possible to prevent the drop of the engine rotation speed when the torque required for generation load is applied to the engine, without an excess idle-up. Therefore, it is possible to efficiently stabilize the idling rotation speed at low cost.

It is thus possible to control the idling rotation speed, due to the combination of the effective increase of the intake air and the control of the generation load of the alternator itself.

We claim:

1. A device for controlling change in idling; comprises an engine, an alternator driven by said engine, means for detecting a field current of said alternator as a generation parameter representing a real condition for a generating operation in said alternator, means for suppressing an increase of said field current based on the field current detected by said field current detecting means, and means for controlling an amount of increase of an intake air of said engine based on said detected field current.

2. A device claimed in claim 1, said field current suppressing means controls an upper limit of a current flow ratio adjusted by a regulator of said alternator, said upper limit being set based on a real current flow ratio just before control.

3. A device claimed in claim 2, said device further comprises means for obtaining a real amount representing a real generation amount based on said real current flow ratio or a real amount representing a real load torque of the engine based on the real generation amount, said intake air controlling means increases the intake air when said obtained real amount goes over a set value.

4. A device claimed in claim 3, when said obtained real amount goes over said set value, a renewal of the upper limit is temporarily stopped.

5. A device claimed in claim 1, said field current detecting means repeatedly detects a current flow ratio and repeatedly calculates an average current flow ratio based on a present detected value and a past detected value, said device further comprises means for setting a newest upper limit based on a last calculated average current flow ratio.

6. A device claimed in claim 5, said newest upper limit exceeds said last calculated average current flow ratio by a set value.

7. A device claimed in claim 6, said device comprises means for obtaining a real amount representing a real generation amount based on said average current flow ratio instead of said real current value or a real value representing a real load torque of the engine based on said real generation amount, said intake controlling means increases the intake air when said obtained real amount goes over a set value.

8. A device claimed in claim 7, when said obtained real amount goes over said set value, said newest upper limit setting means temporarily sets a past upper limit of the current flow ratio as a newest upper limit of the current flow ratio.

9. A device claimed in claim 1, said device further comprises means for detecting a rotation speed of said engine, means for detecting a status of a field current of said alternator, and means for setting a real amount based on the detected rotation speed and the detected status of said alternator, said real amount representing real generation amount of said alternator or representing a real load torque of said engine based on said real generation amount of said alternator and, said intake controlling means controls an amount of an intake air of said engine based on said set real amount.

10. A device claimed in claim 9, said device further comprises means for setting an increase amount of the intake air according to said set real amount.

11. A device claimed in claim 9, said intake controlling means increases the intake air when said real amount goes over a first value.

12. A device claimed in claim 11, said intake controlling means finishes the increase of the intake air when said set real amount falls below a second value being smaller than said first value.

* * * * *